United States Patent
Muller et al.

(10) Patent No.: US 9,982,182 B2
(45) Date of Patent: May 29, 2018

(54) DRILLING COMPOSITION, PROCESS FOR ITS PREPARATION, AND APPLICATIONS THEREOF

(71) Applicants: EMERY OLEOCHEMICALS GMBH, Dusseldorf (DE); PETRO-CANADA LUBRICANTS INC., Mississauga (CA)

(72) Inventors: Heinz Muller, Monheim (DE); Nadja Herzog, Korschenbroich (DE); Diana Maker, Mettmann (DE); Michael Fefer, Whitby (CA); Jun Liu, Oakville (CA)

(*) Notice: Subject to any disclaimer, the term of this patent is extended or adjusted under 35 U.S.C. 154(b) by 0 days. days.

(21) Appl. No.: 15/660,217

(22) Filed: Jul. 26, 2017

(65) Prior Publication Data

US 2017/0335165 A1    Nov. 23, 2017

Related U.S. Application Data

(60) Division of application No. 14/064,501, filed on Oct. 28, 2013, now Pat. No. 9,745,502, which is a continuation of application No. 12/738,701, filed as application No. PCT/EP2008/064423 on Oct. 24, 2008, now abandoned.

(30) Foreign Application Priority Data

Oct. 24, 2007   (EP) ..................... 07020796

(51) Int. Cl.

| | | |
|---|---|---|
| *E21B 43/00* | (2006.01) | |
| *C09K 8/36* | (2006.01) | |
| *E21B 7/00* | (2006.01) | |
| *C09K 8/34* | (2006.01) | |
| *E21B 21/00* | (2006.01) | |
| *E21B 21/01* | (2006.01) | |
| *E21B 10/00* | (2006.01) | |
| *C09K 8/18* | (2006.01) | |

(52) U.S. Cl.
CPC .................. *C09K 8/36* (2013.01); *C09K 8/18* (2013.01); *C09K 8/34* (2013.01); *E21B 7/00* (2013.01); *E21B 10/00* (2013.01); *E21B 21/00* (2013.01); *E21B 21/01* (2013.01); *E21B 43/00* (2013.01)

(58) Field of Classification Search
None
See application file for complete search history.

(56) References Cited

U.S. PATENT DOCUMENTS

| | | |
|---|---|---|
| 2,716,018 A | 8/1955 | Williams |
| 3,899,431 A | 8/1975 | Hayes et al. |
| 4,374,737 A | 2/1983 | Larson et al. |
| 4,436,636 A | 3/1984 | Carnicom |
| 4,787,990 A | 11/1988 | Boyd |
| 5,232,910 A | 8/1993 | Mueller et al. |
| 5,252,554 A | 10/1993 | Mueller et al. |
| 5,254,531 A | 10/1993 | Mueller et al. |
| 5,318,954 A * | 6/1994 | Mueller .................. C09K 8/36 507/138 |
| 5,318,956 A | 6/1994 | Mueller et al. |
| 5,348,938 A | 9/1994 | Mueller et al. |
| 5,403,822 A | 4/1995 | Mueller et al. |
| 5,441,927 A | 8/1995 | Mueller et al. |
| 5,461,028 A | 10/1995 | Mueller et al. |
| 5,569,642 A | 10/1996 | Lin |
| 5,663,122 A | 9/1997 | Mueller et al. |
| 5,755,892 A | 5/1998 | Herold et al. |
| 5,846,601 A | 12/1998 | Ritter et al. |
| RE36,066 E | 1/1999 | Mueller et al. |
| 5,869,434 A | 2/1999 | Mueller et al. |
| 6,022,833 A | 2/2000 | Mueller et al. |
| 6,122,860 A | 9/2000 | Von Tapavicza et al. |
| 6,165,946 A | 12/2000 | Mueller et al. |

(Continued)

FOREIGN PATENT DOCUMENTS

| | | |
|---|---|---|
| CA | 2265197 A1 | 9/2000 |
| DE | 3247123 A1 | 6/1983 |
| DE | 3842659 A1 | 6/1990 |
| DE | 3842703 A1 | 6/1990 |

(Continued)

OTHER PUBLICATIONS

International Preliminary Report on Patentability dated Apr. 27, 2010 in PCT/EP2008/064423.
Maker et al., U.S. Appl. No. 15/533,678, filed Jun. 7, 2017.
Maker et al., U.S. Appl. No. 15/533,698, filed Jun. 7, 2017.

*Primary Examiner* — Angela M DiTrani
(74) *Attorney, Agent, or Firm* — Nexsen Pruet, PLLC; Philip P. McCann

(57) ABSTRACT

The present invention relates to a drilling composition comprising: I) an organic phase comprising components i, from about 20 wt. % to about 99,999 wt. %, based on the total weight of components i. and ii., of at least one linear or branched, cyclic or non-cyclic, saturated hydrocarbon, ii. from about 0.001 wt % to about 25 wt. %, based on the total weight of components i. and ii., of at least one ester, II) from 0 to about 50 wt. %, based on the total weight of the composition, of water or aqueous phase, III) from 0 to about 60 wt. %, based on the total weight of the composition, of at least one additive, wherein the sum of the weight components I) to III) is 100 wt %, to a process for preparation of a drilling composition, to uses of a drilling composition, to a drilling system, to a process for making a borehole, to a process for conveying cuttings, to a process for treating a drill head, to a process for production of at least one of oil and gas.

19 Claims, 1 Drawing Sheet

(56) References Cited

U.S. PATENT DOCUMENTS

Figure 1:
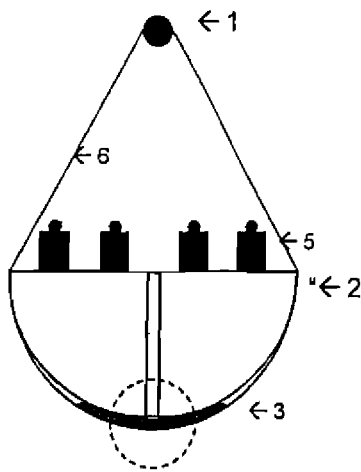
Figures 2, 3:
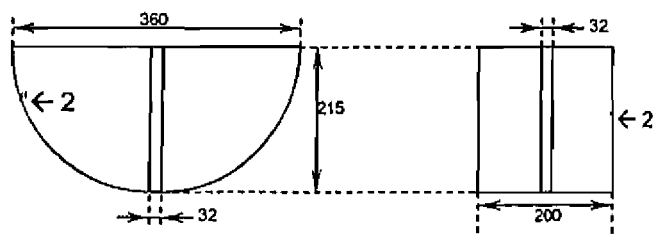
Figure 4:
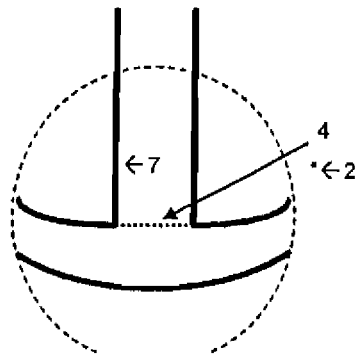

| | | |
|---|---|---|
| 6,289,989 B1 | 9/2001 | Mueller et al. |
| 6,350,788 B1 | 2/2002 | Herold et al. |
| 6,716,799 B1 | 4/2004 | Mueller et al. |
| 6,806,235 B1 | 10/2004 | Mueller et al. |
| 7,666,820 B2 | 2/2010 | Mueller et al. |
| 7,741,248 B2 | 6/2010 | Mueller et al. |
| 8,148,305 B2 | 4/2012 | Westfechtel et al. |
| 8,153,562 B2 | 4/2012 | Mueller et al. |
| 8,193,125 B2 | 6/2012 | Muller et al. |
| 8,236,735 B2 | 8/2012 | Maker et al. |
| 9,085,524 B2 | 7/2015 | Muller et al. |
| 2003/0036484 A1* | 2/2003 | Kirsner .............. C09K 8/34 507/118 |
| 2007/0049500 A1 | 3/2007 | Mueller et al. |
| 2007/0219097 A1 | 9/2007 | Mueller et al. |
| 2007/0219098 A1 | 9/2007 | Mueller et al. |
| 2008/0234145 A1 | 9/2008 | Mueller et al. |
| 2010/0294501 A1 | 11/2010 | Daute et al. |
| 2014/0151061 A1 | 6/2014 | Fefer et al. |
| 2015/0210914 A1 | 7/2015 | Muller et al. |
| 2016/0230069 A1 | 8/2016 | Maker et al. |

FOREIGN PATENT DOCUMENTS

| | | |
|---|---|---|
| DE | 3907391 A1 | 9/1990 |
| DE | 3907392 A1 | 9/1990 |
| DE | 102005051165 A1 | 4/2007 |
| EP | 229912 A2 | 7/1987 |
| EP | 382070 A1 | 8/1990 |
| EP | 449257 A2 | 10/1991 |
| EP | 2207862 B2 | 12/2017 |
| GB | 2158437 A | 11/1985 |
| WO | 2004029175 A1 | 4/2004 |
| WO | 2005012455 A1 | 2/2005 |

* cited by examiner

DRILLING COMPOSITION, PROCESS FOR ITS PREPARATION, AND APPLICATIONS THEREOF

This application is a divisional application of U.S. application Ser. No. 14/064,501 filed Oct. 28, 2013, currently pending, which is a continuation of U.S. application Ser. No. 12/738,701 filed Jun. 11, 2010, now abandoned, which is a national stage application under 35 U.S.C. 371 of International Application No. PCT/EP2008/064423 filed 24 Oct. 2008, and claims priority to European Application No. EP 07 020 796.4 filed 24 Oct. 2007, the disclosures of which are expressly incorporated herein by reference.

The present invention relates to a drilling composition, to a process for preparation of a drilling composition, to uses of a drilling composition, to a drilling system, to a process for making a borehole, to a process for conveying cuttings, to a process for treating a drill head, to a process for production of at least one of oil and gas.

BACKGROUND

In rotary drilling of subterranean wells a drilling fluid, also referred to as drilling mud, is used for various functions, such as suspending and removing cuttings from the well, controlling formation pressures, sealing permeable formations, maintaining wellbore stability, minimizing formation damage, cooling, lubricating and supporting the bit and drilling assembly, transmitting hydraulic energy to tools and bit, ensuring adequate formation evaluation, controlling corrosion of the drilling assembly as far as possible, and facilitating cementing and completion of the well. A further, more recent, aspect is minimizing the effect on the environment.

Drilling fluids are well known from the prior art. They are typically classified according to their base material. In oil base fluids, solid particles are suspended in oil, and water or brine may be emulsified with the oil, usually assisted by a surfactant, whereby the oil is typically the continuous phase. In water base fluids, solid particles are suspended in water and oil may be emulsified therewith, usually in the presence of a surfactant. Oil based drilling fluids are generally used in the form of invert emulsion muds, where the oil phase typically forms the continuous phase. Earlier drilling fluids relied on heavier oils derived from petrochemicals, such as diesel oil. Such oils are now less favored because of their negative environmental impact and there have been a number of publications in the last few years proposing biodegradable drilling fluids or drilling fluid components.

Drilling fluids comprising reduced toxicity hydrocarbon as main component of the oil phase are known, for example from EP 449 257 A2, U.S. Pat. No. 5,569,642 and U.S. Pat. No. 4,787,990. One disadvantage of such systems is, however, that increased amounts of structure building agents such as viscosifiers are often required in order to obtain suitable rheological properties for a drilling fluid.

DE 39 07 391 A1, DE 39 07 392 A1, DE 38 42 703 A1 and DE 38 42 659 A1 describe inverse drilling fluids comprising ester as main component of the oil phase. These drilling fluids are distinguished by improved lubricity and biodegradability compared to mineral oil-based drilling fluids.

SUMMARY

The present invention includes various embodiments as set forth herein.

An object of the present invention was to reduce or even overcome the problems associated with the prior art.

A further object of the present invention was to provide a composition suitable for use as a drilling fluid, preferably for a wide range of onshore and offshore oilfield applications. The composition should preferably allow faster, more efficient and/or more effective drilling operations, under a range of operating conditions, as well as helping to contribute to reduced wear on drilling equipment.

Another object of the present invention was to provide a more ecologically friendly composition suitable for use as an improved drilling fluid.

Another object of the present invention was to provide a process for preparation of such a composition.

A contribution to solving at least one the above objects or further objects arising from the state of the art is made by the subject matter of the category-forming claims. Further developments and preferred embodiments are described in the dependent claims.

DETAILED DESCRIPTION

In particular, a contribution to solving at least one of the above objects is made by a drilling composition comprising
I) an organic phase comprising components
  i. from about 20 wt. % to about 99.999 wt. %, preferably from about 40 wt. % to about 99.990 wt. %, preferably from about 60 wt. % to about 99.900 wt. %, preferably from about 70 wt. % to about 99 wt. %, more preferably from about 80 wt. % to about 98.5 wt. %, yet more preferably from about 85 wt. % to about 98 wt. %, even more preferably from about 90 wt. % to about 98 wt. %, more preferably from about 92 wt. % to about 97 wt. %, most preferably from about 93 wt. % to about 96 wt. %, based on the total weight of components i. and ii., of at least one linear or branched, cyclic or non-cyclic, saturated hydrocarbon,
  ii. from about 0.001 wt. % to about 25 wt. %, preferably from about 0.5 wt. % to about 20 wt. %, more preferably from about 1 wt. % to about 15 wt. %, yet more preferably from about 2 wt. % to about 10 wt. %, even more preferably from about 2 wt. % to about 8 wt. %, more preferably more preferably from about 3 wt. % to about 7 wt. %, most preferably from about 4 wt. % to about 7 wt. %, based on the total weight of components i. and ii., of at least one ester, wherein the sum of the weight components i. and ii. in the organic phase is 100 wt. %,
II) from 0 to about 50 wt. %, preferably from about 5 wt. % to about 50 wt. %, preferably from about 5 wt. % to about 45 wt. %, more preferably from about 5 wt. % to about 35 wt. %, more preferably from about 10 wt. % to about 25 wt. %, based on the total weight of the composition, of water or aqueous phase,
III) from 0 to about 60 wt. %, based on the total weight of the composition, of at least one additive,
wherein the sum of the weight components I) to III) is 100 wt. %.

The drilling composition according to this aspect of the invention is preferably an oil phase for an emulsion to be used as a drilling fluid, or an emulsion to be used as a drilling fluid, the emulsion being preferably a water in oil (W/O) emulsion.

In a preferred form of the organic phase I) according to the invention, component i. comprises at least one synthetic or natural, linear or branched, cyclic or non-cyclic hydrocarbon, preferably at least one synthetic or natural, linear or branched, cyclic or non-cyclic alkane, preferably at least one alkane selected from the group consisting of n-alkanes, i-alkanes, sec-alkanes, tert-alkanes, preferably at least one $C_5$ to $C_{40}$, more preferably at least one $C_8$ to $C_{40}$, yet preferably at least one $C_{10}$ to $C_{30}$, more preferably at least one $C_{10}$ to $C_{25}$ alkane selected from the group consisting of n-alkanes, i-alkanes, sec-alkanes, tert-alkanes, or a mixture of two or more thereof, whereby at least one branched and/or cyclic alkane is preferred and at least one iso-alkane is particularly preferred. In a particularly preferred embodiment of the invention, component i. is a mixture of at least one isoalkane, preferably at least one synthetic isoalkane, and at least one mineral oil, preferably at least one low toxicity or non-toxic mineral oil. Component i., or at least a part thereof, is preferably obtainable by a process described in detail in CA 2,265,197 or U.S. Pat. No. 6,410,488 B1, whose disclosure in this respect is introduced by reference and forms part of the present disclosure. Component i. according to the invention can be characterized by its properties. Component i. preferably has a content of aromatic organic compounds of less than about 10 wt. %, preferably of less than about 8 wt. %, most preferably of less than about 6.5 wt. %, with a preferred polynuclear aromatic content measured by high resolution mass spectrometry (HRMS) according to the United States Environmental Protection Agency (EPA) method of less than 50 ppm, preferably of less than 40 ppm, more preferably less than 30 ppm, yet more preferably less than 20 ppm, most preferably of less than 10 ppm, whereby wt. % and ppm amounts are based on the total amount of component i. Component i. preferred according to the invention also has low sulphur content, for example less than about 10 ppm, more preferably less than about 7 ppm, yet more preferably less than about 5 ppm, most preferably less than about 3 ppm. Preferred components i. also have a viscosity determined according to ASTM D445 at 40° C. of between 1 and 10 centistokes, preferably of less than 7 centistokes, more preferably of less than 5 centistokes, most preferably of between 2 centistokes and 4 centistokes, as well as a pour point determined according to ASTM D97 in the range from about −60° C. to about −10° C., more preferably in the range from about −58° C. to about −15° C. The preferred component i. according to the invention also has low toxicity to animals, to marine life, and to humans, as measured by standard tests such as the mysid shrimp test, and defined by $LC_{50}$ and/or $LD_{50}$ values. Preferred components i. are commercially available products with trade names PureDrill® HT-40, PureDrill® HT30 and PureDrill® IA35 (all from Petro-Canada, Canada), EDC 95-11 (from Total Fluides, France), and Saraline® 185V (from Shell in Malaysia), whereby PureDrill® HT-40 is particularly preferred according to the invention.

In a preferred aspect of the organic phase I) according to the invention, the at least one ester is at least one ester selected from the group consisting of esters formed from at least one $C_1$ to $C_{24}$ monocarboxylic acid with at least one monofunctional alcohol.

The at least one ester of the organic phase I) according to the invention can be selected from natural and synthetic esters, or mixtures of at least two thereof. By natural esters are understood esters which themselves occur naturally, for example esters of plant or animal origin, as well as esters formed from at least one naturally occurring carboxylic acid and/or at least one naturally occurring alcohol. The at least one ester according to the invention preferably has solidification values (pour point and setting point) below −10° C. and more preferably below −15° C. The at least one ester according to the invention is preferably fluid and pumpable at temperatures at least in the range from about −10° C. to about 5° C., preferably at temperatures in the range from about 0° C. to about 5° C., as well as above 5° C. At the same time, particularly for safety reasons, the flash points of these esters are preferably as high as possible, whereby the at least one ester preferably has a flash point measured according to ASTM D93 above about 80° C., preferably above about 100° C., more preferably above about 120° C., yet more preferably above about 150° C., even more preferably above about 160° C. The esters preferred according to the invention also advantageously have viscosity values (measured according to ASTM D2983, using a Brookfield RVT viscometer) at temperatures of 0° C. to 5° C. of not more than 50 mPa·s and preferably of at most 45 mPa·s or lower. Esters which are preferred according to the invention are described in DE 39 07 391 A1, DE 39 07 392 A1, DE 38 42 703 A1 and DE 38 42 659 A1, whose disclosure concerning esters is hereby incorporated into the present disclosure.

When selecting the appropriate alcohol components for the esters it is recommended to take account of the following additional considerations: When the ester is used in practice, it is not always possible to exclude partial saponification of the ester. Free alcohols form, in addition to the free carboxylic acids thus formed or carboxylic acid salts forming together with the alkali reserves. They should be selected such that even after partial hydrolysis operational conditions are ensured which are ecologically and toxicologically harmless, with inhalation-toxicological considerations in particular being taken into account. The alcohols used for the ester formation preferably in particular possess such a low volatility that in the free state under conditions to be expected in practice, they do not result in any nuisance on the working platform.

The at least one ester of component ii. of the composition according to the invention can be described by means of the following sub-classes.

In a first sub-class of the at least one ester of component ii. of the present invention, the at least one ester is preferably selected from $C_1$-$C_5$ monocarboxylic acid esters. The esters of $C_1$-$C_5$ monocarboxylic acids are reaction products of monofunctional alcohols, i.e. alcohols with one hydroxy group. In this case the carbon number of the alcohol is at least 6, but is preferably higher, for example at least 8 to 10 carbon atoms.

In this sub-class of the at least one ester of component ii. of the composition according to the invention the most preferred esters are derived from monocarboxylic acids with 2 to 4 carbon atoms, with acetic acid being particularly preferred as the ester-forming component.

For this sub-class of esters based on very short-chain ($C_1$-$C_5$) monocarboxylic acids, it is preferred to use comparatively long-chain monofunctional alcohols, preferably with up to 24 carbon atoms, preferably with from 6 to 24, more preferably from 8 to 24 carbon atoms, so as to reduce sufficiently the volatility of the ester. It is regarded as particularly preferred that even after partial hydrolysis in use, the drilling fluids are ecologically and toxicologically harmless, particularly inhalation-toxicologically harmless under working conditions. In practical use it is assumed that the at least slightly heated drilling fluid is re-circulated and freed, particularly by screening, from the drill cuttings it takes up. With progressive ageing and the partial hydrolysis thus caused, problems can arise not only from the formation of free fatty acids and their salts, but the freed alcohol components can also cause difficulties in practical operation. This alcohol content must always be taken into consideration if alcohol vapor nuisance is to be expected as a result of its volatility and the required operation temperatures.

Suitable alcohols, particularly suitable monofunctional alcohols can be of natural and/or synthetic origin. Straight-chain and/or branched alcohols can be used here. If monofunctional alcohols of natural and/or synthetic origin which are predominantly aliphatic saturated are present in the esters used according to the invention, then such alcohols with 8 to 15 carbon atoms are thus preferably used for ester formation. Their vapor pressure is so low in the operational conditions occurring in practice that the problem area addressed above does not apply here. Olefin mono- and/or poly-unsaturated alcohols are also suitable, such as can be obtained, for example, by the selective reduction of naturally occurring unsaturated carboxylic acids, for example fatty acids, or their esters. The alcohols can, however, also be of synthetic origin.

Esters of monofunctional alcohols are not, however, limited to this carbon number range. Higher monofunctional alcohols can also be considered, of which the esters with the carboxylic acids of medium chain length defined according to this embodiment of the invention yield oils or oil components with usable rheological properties. Particularly to be considered here are olefin mono- and/or poly-unsaturated alcohols which can, for example, have up to 24 carbon atoms or even higher numbers of carbon atoms. Alcohols of this type can be obtained in particular by the selective reduction of corresponding natural fatty acids.

In a second sub-class of the at least one ester of component ii. of the composition according to the invention, the esters, fluid at room temperature and having flash points above 80° C., are derived from monocarboxylic acids of synthetic and/or natural origin with 6 to 11 carbon atoms and monofunctional alcohols.

In this embodiment it is also preferred that alcohol components are used in the esters which even after a partial ester cleavage are ecologically and toxicologically harmless in practical use, in particular the invention takes into account in this regard the inhalation-toxicological problems which can become significant when dealing with the oil-base composition in practical use.

In this sub-class of the at least one ester of component ii. of the composition according to the invention, the esters are based, on the carboxylic acid side, on synthetic and/or natural monocarboxylic acids with 6 to 11 carbon atoms, which can be straight-chain and/or branched. Straight-chain and as a rule even-numbered carboxylic acids in this range can be derived particularly from oils or fats of natural origin and are known to form the so-called pre-fatty-acids with from 6 to 10 carbon atoms. Synthetic carboxylic acids of this type are also easily obtainable, for example, by the oxidation of Ziegler alcohols. Branched, or mixtures of branched and straight-chain carboxylic acids in this range can be obtained from numerous processes in the petrochemical industry. Esters of this type preferably contain at least 6 and better still at least 7 carbon atoms in the alcohol component. With this comparatively high lower limit value for the alcohol component, it is possible to ensure that in practical use, even after a partial ester cleavage, toxicological and particularly inhalation-toxicological problems can be overcome by simple means. Particularly preferred alcohols are those having up to 24 or more carbon atoms and the $C_8$ to $C_{15}$ alcohols mentioned above in connection with the first sub-class of the at least one ester of component ii. of the composition according to the invention.

In a third sub-class of the at least one ester of component ii. of the composition, these are esters of saturated aliphatic $C_{12}$-$C_{16}$ monocarboxylic acids and monofunctional $C_2$-$C_{12}$, preferably $C_4$-$C_{12}$ alcohols or mixtures thereof.

The presence of saturated carboxylic acids containing less than 16 carbon atoms and, more especially, from 12 to 14 carbon atoms is preferred in this context. In small quantities, the contents of such lower, fully saturated fatty acids often present in natural starting materials are frequently valuable mixture components. Their esters are not vulnerable to oxidation under practical in-use conditions and their rheological properties allow them to replace to a certain extent pure hydrocarbon oils in practice.

In one particularly preferred aspect of this sub-class of the at least one ester of component ii. of the composition of the invention as described above, at least the predominant part, i.e. at least 50%, preferably at least 60%, of the ester used is based on saturated aliphatic $C_{12}$-$C_{14}$ monocarboxylic acids.

The esters used in accordance with this sub-class of the at least one ester of component ii. of the composition of the invention of monofunctional alcohols and selected monocarboxylic acids can be derived from either straight chain or branched hydrocarbon chains. Preferred are the esters of straight chain acids, in particular the esters of saturated $C_{12-16}$ and more especially $C_{12-14}$ monocarboxylic acids and monofunctional alcohols having the C chain lengths defined in accordance with this sub-class of the at least one ester of component ii. of the composition of the invention. These can form esters which show adequate rheological properties, even down to temperatures in the range of from 0 to 5° C., and in particular are flowable and pumpable in that temperature range. In the context of this sub-class of the at least one ester of component ii. of the composition of the invention, preferred esters are saturated compounds which have a Brookfield (RVT) viscosity, measured as described above, at a temperature of 0° C. to 5° C., of no more than 50 mPa·s and preferably of no more than 40 mPa·s. By selecting suitable components for the ester-forming reaction, it is possible to adjust the viscosity at temperatures in the above-mentioned range to values of at most 30 mPa·s, for example in the range of from 10 to 20 mPa·s. It is clear that this affords important advantages for offshore drilling where the surrounding water can have very low temperatures.

The alcohol components of the esters or ester mixtures according to this embodiment of the invention are preferably derived from straight-chain and/or branched-chain saturated alcohols, preferably alcohols containing at least 3 carbon atoms and, more especially, to alcohols containing up to about 10 carbon atoms, whereby alcohols with 4, 5, 6, 7, 8, or 9 carbon atoms can also be used. The alcohols can also be of natural origin, in which case they have normally been obtained from the corresponding carboxylic acids or their esters by hydrogenating reduction. However, the invention is by no means limited to starting materials of natural origin. Both on the monoalcohol side and on the monocarboxylic acid side, the starting materials of natural origin may be partly or completely replaced by corresponding components of synthetic origin. Typical examples of alcohols are the corresponding oxo alcohols (branched alcohols) and the linear alcohols obtained by the Ziegler process. Similarly, monocarboxylic acid components present in particular in carboxylic acid mixtures can be derived from petrochemical synthesis.

In a preferred embodiment, the esters used in accordance with this aspect of the composition according to the invention based on selected individual components or on ester mixtures have solidification values (pour point and setting point) below −10° C. and more especially below −15° C.

Despite this high mobility at low temperatures, the molecular size of the ester in accordance with the invention ensures that the flash points of the esters are sufficiently high, being at least 80° C., but generally exceeding a temperature limit of about 100° C. Esters having flash points above 150° C. to 160° C. are preferred. It is possible to produce esters of the described types which have flash points of 185° C. or higher.

In another preferred aspect of this third sub-class of the at least one ester of composition ii. according to the invention, the esters of the range required in accordance with the invention for the saturated $C_{12-16}$ monocarboxylic acids are derived from materials of predominantly vegetable origin. Carboxylic acids or carboxylic acid mixtures predominantly containing saturated monocarboxylic acids within the stated range can be obtained, for example, from renewable triglycerides, such as coconut oil, palm kernel oil and/or babassu oil. Fatty acid mixtures of this origin normally contain a limited quantity of lower fatty acids ($C_{6-10}$) of generally at most about 15%. Their content of $C_{12-14}$ acids is by far predominant, generally making up at least 50% and normally 60% or more of the carboxylic acid mixture. The small remainder consists of higher fatty acids, with unsaturated components playing a considerable role. Accordingly, carboxylic acid mixtures of this type, by virtue of their natural structure, readily lead to materials having satisfactory rheological properties.

In a fourth sub-class of the at least one ester of component ii. of the composition according to the invention these can be esters of monofunctional $C_2$-$C_{12}$ alcohols (alkanols) and olefinically mono- and/or polyunsaturated $C_{16}$-$C_{24}$ monocarboxylic acids or mixtures thereof with small quantities of other, more especially saturated monocarboxylic acids.

The esters according to this embodiment may be assigned to the class of reaction products of monofunctional carboxylic acids, preferably $C_{16}$-$C_{24}$ carboxylic acids, with monofunctional alcohols. The carboxylic acids may be derived from unbranched or branched hydrocarbon chains, preferably linear chains. Monocarboxylic acids of this type and of the $C_{16}$-$C_{24}$ range and esters thereof are unsuitable as predominantly saturated hydrocarbon compounds due to their comparatively high solidification points. Even then, however, esters of this type are flowable and pumpable down to temperatures of 0° C. to 5° C. providing an adequate level of olefinically unsaturated ester constituents is provided. In this sub-class of the at least one ester of component ii. of the composition of the invention, therefore, esters of the described type of which more than 70% by weight and preferably more than 80% by weight are derived from olefinically unsaturated $C_{16}$-$C_{24}$ carboxylic acids are preferably used. Preferred natural starting materials are carboxylic acid mixtures which contain at least 90% by weight olefinically unsaturated carboxylic acids in the above C range. The unsaturated carboxylic acids may be mono- and/or polyolefinically unsaturated. Where carboxylic acids or carboxylic acid mixtures of natural origin are used, the double ethylenic double bond in particular and, to a lesser extent, even a triple ethylenic double bond per carboxylic acid molecule plays a role in addition to a single ethylenic double bond in the molecule. Particulars of this are given in the following.

In conjunction with the choice of esters of monofunctional reactants in accordance with the fourth sub-class of the at least one ester of component ii. of the composition of the invention, the choice of such a comparatively highly unsaturated carboxylic acid component in the esters ensures that the esters, and invert emulsions comprising them, show the rheological properties required in practice, particularly at relatively low temperatures. The comparatively highly unsaturated esters containing 16 to 24 carbon atoms in the monocarboxylic acid component, which are used in accordance with this embodiment of the invention, have solidification points (pour point according to ASTM D97 and setting point) below −10° C. and more especially below −15° C. Despite this high mobility at low temperatures, the molecular size of the ester prescribed in accordance with this aspect of the invention ensures that the flashpoints of the esters are sufficiently high, being at least 80° C., and generally exceeding a temperature limit of approximately 100° C. Esters having flashpoints above 160° C. are preferred. Esters of the described type showing high mobility, even at low temperatures, and having flashpoints of 185° C. or higher can be produced without difficulty by processes known to the skilled person.

In conjunction with these high flashpoints determined by the size of the molecule, it is possible at the same time to ensure that the viscosity values are within the required limits. Thus, preferred esters of the type described for this embodiment according to the invention show a viscosity (measured with a Brookfield RVT viscometer as above) at a temperature of 0° C. to 5° C. of not more than 55 mPa·s and preferably of at most 45 mPa·s or lower. It is possible to adjust values of 30 or even higher, for example in the range of from 20 to 25 mPa·s, at temperatures in the range indicated.

Among the unsaturated esters suitable for use in accordance with this fourth sub-class of the at least one ester of component ii. of the composition of the invention, there are two preferred types of ester.

The first of these preferred types of ester is based on unsaturated $C_{16}$-$C_{24}$ monocarboxylic acids of which no more than about 35% by weight are diolefinically and, optionally, polyolefinically unsaturated. In their case, therefore, the content of di- and polyunsaturated carboxylic acid residues in the ester is comparatively limited. Within this sub-class it is preferred that at least about 60% by weight of the carboxylic acid residues are monoolefinically unsaturated.

The second preferred type of ester is derived from $C_{16}$-$C_{24}$ unsaturated monocarboxylic acid mixtures of which more than 45% by weight and preferably more than 55% by weight are derived from diolefinically and/or polyolefinically unsaturated acids within the above C range.

Preferred monoethylenically unsaturated carboxylic acids within the above carbon range are hexadecenoic acids (palmitoleic acid ($C_{16}$)), oleic acid ($C_{18}$), the related ricinoleic acid ($C_{18}$) and erucic acid ($C_{22}$). A preferred di-unsaturated carboxylic acid within the range in question here is linoleic acid ($C_{18}$) while a preferred triethylenically unsaturated carboxylic acid is linolenic acid ($C_{18}$).

Selected individual esters formed from an unsaturated monocarboxylic acid and a monoalcohol can be used as the ester in accordance with this fourth sub-class of the at least one ester of component ii. of the composition of the invention. One example of such esters is given by the esters of oleic acid, for example of the oleic acid isobutyl ester type. So far as the rheology of the system is concerned and/or for reasons of availability, it is frequently desirable to use esters from acid mixtures. This is preferred so far as meeting the preferred specifications of the esters according to this aspect of the invention is concerned. This can also be preferred for all embodiments of the ester in the composition according to the invention, not only for this sub-class.

As already mentioned, the first of these two types is distinguished by the fact that its content of di-unsaturated and polyunsaturated acids is limited and does not exceed about 35% by weight. Vegetable oils of natural origin, of which the hydrolysis or transesterification gives mixtures of carboxylic acids or carboxylic acid esters of the type required here, are for example palm oil, peanut oil, castor oil and, in particular, rapeseed oil. Suitable rapeseed oils are both traditional types of high erucic acid content and also the more modern types of reduced erucic acid content and increased oleic acid content.

Esters of the first type according to this sub-class of the at least one ester of component ii. of the composition according to the invention which correspond to this definition have the advantage that problems possibly arising from the lack of stability to oxidation are reduced. In practice, the drilling composition is continuously pump-circulated and, in the process, is brought constantly into contact with atmospheric oxygen, often over a large area and at least slightly elevated temperatures, for the purpose of separating out the rock cuttings brought up, for example by sieving.

However, carboxylic acid mixtures of the second type mentioned in connection with this fourth sub-class of the at least one ester of component ii. of the composition of the invention are also of practical significance for use in accordance with the invention. This is attributable in part to their broad accessibility from natural fats of animal and/or vegetable origin. Examples of oils which have a high content of $C_{16-18}$ or $C_{16-22}$ carboxylic acids and which, at the same time, contain at least about 45% of at least diethylenically unsaturated carboxylic acids are cottonseed oil, soybean oil, sunflower oil and linseed oil. The tall oil acids isolated during the recovery of cellulose also fall within this range. However, starting materials of the last type are generally distinguished by more or less large additional contents of resin constituents. A typical animal starting material for the production of corresponding carboxylic acid mixtures is fish oil, particularly herring oil.

The alcohol components of the esters or ester mixtures according to this fourth aspect of the composition ii. of the invention are preferably derived from straight chain and/or branched-chain saturated alcohols, preferably alcohols containing at least four carbon atoms and, more preferably alcohols containing up to about ten carbon atoms, as described above. The alcohols can also be of natural origin, in which case they have normally been obtained from the corresponding carboxylic acids or their esters by hydrogenating reduction, or they can be of synthetic origin.

Esters which are particularly preferred according to the invention are based on $C_8$-$C_{14}$ fatty acids or difatty acids thereof, or on $C_8$-$C_{10}$ or $C_{12}$-$C_{14}$ fatty acids or difatty acids thereof, of which $C_8$-$C_{14}$ fatty acids or $C_{12}$-$C_{14}$ fatty acids are preferred. Particularly preferred esters are based on $C_8$ to $C_{14}$, $C_8$ to $C_{10}$ and/or $C_{12}$ to $C_{14}$ fatty acids, esterified with a branched alcohol, preferably with a branched $C_4$ to $C_{12}$ alcohol, yet more preferably with a branched $C_6$-$C_{10}$ alcohol, yet more preferably with a branched $C_7$-$C_9$ alcohol, more preferably with an ethylpentyl alcohol, a propylpentyl alcohol, an ethylhexyl alcohol, a propylhexyl alcohol, an ethylheptyl alcohol, a propylheptyl alcohol, more preferably with an ethylhexyl alcohol, preferably with 2-ethylhexyl alcohol or with 3-ethylhexyl alcohol, most particularly preferably with 2-ethylhexyl alcohol. So far as the rheology of the system is concerned and/or for reasons of availability, it is frequently desirable to use esters from acid mixtures.

In a preferred embodiment, the at least one ester has a carbon chain distribution of the acid-derived component determined by gas chromatography (GC) according to ISO 5508 with carbon numbers in the ranges of from 0 to 2.00%, preferably in the range of from 0 to 1.00%, more preferably in the range of from 0 to 0.5% $C_6$, in the range of from 3.00% to 10.00%, preferably in the range of from 3.00 to 8.00%, more preferably in the range of from 4.00 to 7.00% $C_8$, in the range of from 3.00% to 10.00%, preferably in the range of from 3.00 to 9.00%, more preferably in the range of from 5.00 to 8.00% $C_{10}$, in the range of from 50.00% to 94.00%, preferably in the range of from 55.00 to 90.00%, more preferably in the range of from 60.00 to 85.00% $C_{12}$, in the range of from 0 to 25.00%, preferably in the range of from 5.00 to 20.00%, more preferably in the range of from 10.00 to 20.00% $C_{14}$, in the range of from 0 to 5.00%, preferably in the range of from 1.00 to 4.00%, more preferably in the range of from 2.00 to 4.00% $C_{16}$ and in the range of from 0 to 1.00%, preferably in the range of from 0.01 to 0.90%, more preferably in the range of from 0.1 to 0.6% $C_{18}$. The acid-derived component determined by gas chromatography of an ester refers to the chromatographic equivalent of an acid, which would have been formed upon hydrolytic cleavage of that ester into an alcohol and an acid.

In another preferred embodiment, the at least one ester has a carbon chain distribution of the acid-derived component determined by gas chromatography (GC) according to ISO 5508 with carbon numbers in the range of from 0 to 2.00%, preferably in the range of from 0 to 1.00%, more preferably in the range of from 0 to 0.5% $C_6$, in the range of from 0 to 10.00%, preferably in the range of from 1.00 to 7.00%, more preferably in the range of from 2.00 to 5.00% $C_8$, in the range of from 0 to 10.00%, preferably in the range of from 1.00 to 7.00%, more preferably in the range of from 2.00 to 5.00% $C_{10}$, in the range of from 50.00% to 95.00%, preferably in the range of from 60.00 to 90.00%, more preferably in the range of from 65.00 to 85.00% $C_{12}$, in the range of from 5.00% to 35.00%, preferably in the range of from 8.00 to 30.00%, more preferably in the range of from 10.00 to 25.00% $C_{14}$, in the range of from 0 to 5.00%, preferably in the range of from 1.00 to 4.00%, more preferably in the range of from 2.00 to 4.00% $C_{16}$ and in the range of from 0 to 1.00%, preferably in the range of from 0.01 to 0.90%, more preferably in the range of from 0.1 to 0.6% $C_{18}$. The acid-derived component determined by gas chromatography of an ester refers to the chromatographic equivalent of an acid, which would have been formed upon hydrolytic cleavage of that ester into an alcohol and an acid.

The at least one ester used as component ii. of the composition according to the invention preferably has at least one, preferably at least two, more preferably at least three, yet more preferably at least four, more preferably at least five, more preferably all of the following properties, in any combination with each other:

α1) a viscosity determined according to ASTM D2983 using a Brookfield RVT viscometer (Brookfield, RVT viscosity) at temperatures of 0° C. to 5° C. of not more than 50 mPa·s, preferably of not more than 10 mPa·s and preferably in the range of from about 2.0 to 5.0 mPa·s, more preferably in the range of from about 2.5 to 4.5 mPa·s, yet more preferably in the range of from about 2.7 to 4.0 mPa·s;

α2) an acid value determined according to ISO 660 in a range of from 0 to 2.0 mg KOH/g, preferably in a range of from 0.001 to 1.8 mg KOH/g, preferably in a range of from 0.01 to 1.5 mg KOH/g, preferably in a range of from 0.05 to 1.0 mg KOH/g;

α3) a hydroxyl value determined according to DIN 53240 in a range from 0 to 1.5 mg KOH/g, preferably in a range from 0 to 1.0 mg KOH/g, more preferably in a range from 0 to 0.8 mg KOH/g;

α4) biodegradability in seawater measured according to OECD Guideline for Testing of Chemicals, No. 306, adopted 17 Jul. 1992, in the range of from 90% to 100%, preferably in the range of from 92% to 100%, more preferably in the range of from 95% to 100%;

α5) non-toxicity measured by the 96 hour $LC_{50}$ Mysid shrimp acute toxicity bioassay test result of greater than 800,000, preferably of greater than 900,000, more preferably of greater than 1,000,000 and most preferably of greater than 1,100,000.

α6) a flashpoint measured according to ASTM D93 of above 150° C., more preferably of above 160° C., even more preferably of above 170° C., yet more preferably above 175° C., more preferably in a range from 175° C. to 200° C., even more preferably in a range from 177° C. to 182° C.

It is also possible according to a further embodiment of the composition according to the invention that the at least one ester is a mixture of at least two esters selected from any of the esters described above.

The composition as preferred according to the invention can comprise only or predominantly starting materials of natural origin, but is by no means limited to starting materials of natural origin. Both on the alcohol side and on the carboxylic acid side, the starting materials may be of natural origin or may be partly or completely of synthetic origin. Starting materials of natural origin are advantageous in their proven lower toxicological values, their ready degradability and their ready accessibility. The ultimately desired destruction, preferably natural destruction, of the used composition is favored if esters of the type described herein are both aerobically and anaerobically degradable.

The water or aqueous phase according to component II) of the composition according to the invention is preferably a salt solution, preferably a saturated salt solution, preferably a saturated solution of $CaCl_2$ and/or KCl.

Multi-substance mixtures further comprising one or more additives also fall within the framework of the invention. In principle, any mixtures can be used provided that they fulfill the basic rheological requirements for drilling fluids, in particular for invert-drilling fluids.

Additives according to the invention can be any additives which are commonly used in drilling compositions and which are known to the skilled person. In a preferred aspect of the composition according to the invention, the at least one additive is at least one additive selected from the group consisting of weighting agents, fluid loss additives, pH modifiers such as, for example, alkali reserves, viscosity modifiers, filtration control agents, emulsifiers, salts, wetting agents, dispersants.

Weighting agents suitable for use in drilling compositions are well known to the skilled person. Weighting agents suitable according to the invention are preferably water-insoluble weighting agents such as barite, calcite, mullite, galena, hematite, manganese oxides, iron oxides, or combinations of these, or water-soluble weighting agents such as water soluble salts of zinc, iron, barium, calcium or combinations of these and similar compounds. Further examples of suitable weighting agents are $Fe_2O_3$, $MnO_4$ and $CaCO_3$. The weighting agent preferred according to the invention to establish the necessary pressure equalization is barite, which comprises predominantly barium sulphate, which is added in quantities adapted to the particular conditions to be expected in the well. For example, it is possible by addition of barite to increase the specific gravity of the drilling mud to values of up to 2.5 and preferably in the range of from 1.3 to 1.6.

Fluid loss additives can be used in embodiments of the composition according to the invention. In a preferred embodiment according to the invention, organophilic lignite is used as a fluid loss additive and, hence, for forming an impervious coating in the form of a substantially liquid-impermeable film over the walls of the well. Suitable quantities are, for example, in the range of from 15 to 20 lb/bbl or in the range of from 20 to 60% by weight, preferably in a range of from 30 to 50% by weight, based on the ester phase.

Use may also be made according to the invention of agents which modify the pH of the composition: Examples are given in EP 382 070 A1. The teaching of this earlier application is based on the concept of using a further additive in ester-based invert drilling fluids, which is suited to keeping the desired rheological data of the drilling fluid in the required range even when, in use, increasingly large amounts of free carboxylic acids are formed by partial ester hydrolysis. These liberated carboxylic acids should not only be trapped in a harmless form, it should moreover be possible to reform these free carboxylic acids, preferably into valuable components with stabilizing or emulsifying properties for the whole system. According to this teaching, alkaline amine compounds of marked oleophilic nature and at best limited water solubility, which are capable of forming salts with carboxylic acids, can be used as additives in the oil phase. The oleophilic amine compounds can at the same time be used at least in part as alkali reserves in the invert drilling fluid, they can however also be used in combination with conventional alkali reserves, particularly together with lime. The use of oleophilic amine compounds which are at least largely free from aromatic constituents is preferred. In particular, optionally olefin unsaturated aliphatic, cycloaliphatic and/or heterocyclic oleophilic basic amine compounds, can be considered, which contain one or more N-groups capable of forming salts with carboxylic acids. In a preferred embodiment the water-solubility of these amine compounds at room temperature is at most about 5% by weight and is most preferably below 1% by weight.

Typical examples of such amine compounds are primary, secondary and/or tertiary amines, which are at least predominantly water-insoluble, and which can also to a limited extent be alkoxylated and/or substituted particularly with hydroxyl groups. Further examples are corresponding aminoamides and/or heterocycles containing nitrogen as ring constituent. For example, basic amine compounds are suitable which have at least one long-chain hydrocarbon radical with preferably 8 to 36 carbon atoms, particularly with 10 to 24 carbon atoms, which can also be olefin mono- or poly-unsaturated. The oleophilic basic amine compounds can be added to the drilling fluid in amounts of up to about 10 lb/bbl, preferably in amounts up to about 5 lb/bbl and particularly in the range of about 0.1 to 2 lb/bbl. It has emerged that the use of such oleophilic basic amine compounds can effectively prevent thickening of the mud system, which has previously been attributed to a disturbance in the W/O invert system and also to the formation of free carboxylic acids by ester hydrolysis.

One preferred limitation is associated with the use of the esters according to the third and fourth embodiments in invert oil drilling fluids of the type used in the present invention. This limitation arises out of the difficulty that, in principle, the carboxylic acid esters are vulnerable to hydrolysis.

It is preferred in all embodiments, but particularly in the third and fourth embodiments that strong hydrophilic bases of inorganic and/or organic nature, such as alkali metal hydroxides or strongly hydrophilic amines such as diethanolamine and/or triethanolamine, are not used in significant quantities as alkali reserve. Lime (calcium hydroxide) is often added as the alkali reserve, more especially for protection against inrushes of acidic gases such as $CO_2$ and/or $H_2S$ into the drilling fluid and hence for protection against corrosion. An addition of lime such as this may be used as the alkali reserve in accordance with the invention. However, it is preferred to ensure that only comparatively small quantities of this alkaline component are incorporated. In a preferred embodiment of the invention, the maximum addition of lime is of the order of 2 lb/bbl (lime/drilling composition), and it may be preferred to work with lime contents in the drilling mud slightly below this, e.g., therefore from about 0.5 to about 1.8 lb/bbl (lime/drilling fluid). Other known alkali reserves can be used in addition to or in place of the lime. The less basic metal oxides, such as zinc oxide, should particularly be mentioned here. Even when these acid traps are used, care is still taken that the amounts used are not too large, so as to prevent undesired premature ageing of the drilling fluid, associated with an increase in viscosity and therefore a deterioration in the rheological properties. The special features discussed here of the process according to the invention prevent, or at least restrict, the formation of undesirable amounts of highly active O/W emulsifiers, so that the good rheological properties are maintained for a sufficiently long time in use even when there is thermal ageing.

Viscosity modifiers suitable for use in drilling compositions are well known to the skilled person. Viscosity modifiers can be viscosifiers (also known as structure building agents or thickeners) which increase viscosity, or deflocculants which decrease viscosity, whereby in the present invention viscosifiers are preferred. Viscosifiers can be selected from organic or inorganic thickeners, for example, xanthan gum, guar gum, glycol, carboxymethylcellulose, polyanionic cellulose or starch. Deflocculants can be selected from anionic polyelectrolytes such as acrylates, polyphosphates, lignosulfonates or tannic acid derivatives such as Quebracho. A viscosifier preferred according to the invention is a cation-modified finely particulate bentonite, which can be used particularly in amounts of about 8 to 10 lb/bbl (pounds per barrel) or from about 1 to about 60 wt. %, preferably from about 2 to about 55% by weight, based on the total weight of the composition.

The emulsifiers which can be used in practice according to the invention are systems which are capable of forming water in oil (W/O) emulsions. In particular, selected oleophilic fatty acids or salts thereof, for example, those based on amidoamine compounds, in particular polyaminated fatty acids, can be considered. Examples of these are described in U.S. Pat. No. 4,374,737 and the literature cited therein. Particularly preferred emulsifiers are reaction products of a polyamine with a fatty acid or fatty acid anhydride to give a fatty amide, which is subsequently reacted with an anhydride, preferably maleic acid anhydride, acrylic acid anhydride or fumaric acid anhydride, most preferably maleic acid anhydride, in the presence of at least one crosslinker. Examples of these are described in U.S. Pat. No. 4,658,036 and the literature cited therein, whose disclosures are hereby incorporated by reference. A particularly suitable type of emulsifier is the product sold by Halliburton (Baroid Fluid Services) under the brand name "EZ-MUL®".

Emulsifiers of the type in question are sold commercially as highly concentrated active-substance preparations and in one embodiment can, for example, be used in amounts of about 20 to 80% by weight, particularly in amounts of about 30 to 70% by weight, based on the organic phase. It is, however, preferred that emulsifiers are used in amounts in the range from about 0.5 wt. % to about 15 wt. %, preferably in amounts in the range from about 0.5 wt. % to about 10 wt. %, more preferably in amounts in the range from about 1 wt. % to about 8 wt. %, more preferably in amounts in the range from about 1 wt. % to about 6 wt. %, based on the organic phase.

The aforementioned emulsifiers or emulsifier systems can optionally also be used to improve the oil wetability of the inorganic weighting materials. In addition to the aminoamides already discussed, alkyl benzenesulfonates and imidazoline compounds are further examples. Additional information regarding these and also regarding the relevant prior art can be found in the following publications: GB 2 158 437, EP 229 912 and DE 32 47 123, whose disclosures are hereby incorporated by reference.

The at least one salt is preferably selected from the group consisting of metal halides, particularly preferably alkali metal or alkaline earth metal halides. The dispersed aqueous phase in the composition according to the invention, which is preferably in the form of an invert drilling fluid, is preferably loaded with soluble salts. Calcium chloride and/or potassium chloride are preferably used here, and saturation of the aqueous phase with the soluble salt at room temperature is preferred.

In the aspect of the composition according to the invention comprising water or aqueous phase, the composition is preferably in the form of an emulsion, preferably in the form of a nanoemulsion or a microemulsion, preferably in the form of a water-in-oil emulsion with number average droplet sizes smaller than 1000 µm, preferably in the range from about 5 nm to about 1000 µm, preferably in the range from 10 nm to 850 µm, more preferably in the range from 20 nm to 700 µm, more preferably in the range from 50 nm to 500 µm. The terms "microemulsion" and "nanoemulsion" according to the invention are used to refer to emulsions with droplet sizes in the micrometer and nanometer ranges respectively, whereby there is a certain amount of overlap between the two ranges and thus the two terms. According to some definitions in the prior art, microemulsions are generally considered to form spontaneously on combination of the emulsion components, whereas the formation of nanoemulsions is generally considered to require input of energy, for example in the form of homogenization, in particular high pressure homogenization.

The drilling composition according to the invention preferably has at least one, preferably at least two, more preferably at least three of the following properties:

β1) a plastic viscosity (PV) measured at 50° C. according to the herein described test method in the range from 15 to 75 mPa·s, preferably in a range of from about 15 to about 60 mPa·s, more preferably in a range of from about 15 to about 40 mPa·s, more preferably in a range of from about 15 to about 30 mPa·s, yet more preferably in a range of from about 15 to about 25 mPa·s;

β2) a yield point (YP) measured at 50° C. according to the herein described test method in the range from 5 to 45 lb/100 ft$^2$ (about 2.4 to about 21.6 Pa), preferably in a range of from about 5 to about 40 lb/100 ft$^2$ (about 2.4 to about 20 Pa), preferably in a range of from about 6 to about 25 lb/100 ft$^2$, (about 2.9 to about 12 Pa), more preferably in a range of from about 8 to about 20 lb/100 ft$^2$, (about 3.8 to about 10 Pa);

β3) a gel strength (GS) measured at 50° C. according to the herein described test method in the range from 4 to 25 lb/100 ft$^2$ (1.9 to 12 Pa), preferably in a range of from about 4 to about 15 lb/100 ft² (about 1.9 to about 7.2 Pa), preferably in a range of from about 4 to about 10 lb/100 ft², (about 1.9 to about 4.8 Pa), more preferably in a range of from about 4 to about 8 lb/100 ft², (about 1.9 to about 3.8 Pa);

β4) viscosity values (measured according to ASTM D2983, using a Brookfield RVT viscometer) at temperatures of 0° C. to 5° C. of not more than 50 mPa·s, preferably of not more than 15 mPa·s and preferably in the range of from about 2.0 to 5.0 mPa·s, more preferably in the range of from about 2.5 to 4.5 mPa·s, yet more preferably in the range of from about 2.7 to 4.0 mPa·s;

β5) storage stability at 20° C. of at least two weeks, preferably of at least one month, more preferably of at least three months, more preferably of at least six months, more preferably of at least one year, whereby the combinations of properties β1)β2), β1)β3), β2)β3), β1)β2)β3), β1)β2)β3)β4), β1)β2)β3)β5), β1)β2)β3)β4)β5), are preferred, whereby the property combinations β1)β2)β3), β1)β2)β3)β4), β1)β2)β3)β5) and β1)β2)β3)β4)β5), are particularly preferred.

One application for the drilling compositions according to the invention is in offshore drilling for the development of oil and/or gas sources, to provide technically useful drilling fluids of good ecological compatibility. The use of the new drilling fluids is, however, not limited to the offshore sector. The new drilling fluids can also be used quite generally for land-supported drilling, including for example geothermal drilling, water drilling, geoscientific drilling and mine drilling. In this case, too, the ester-comprising drilling compositions in accordance with the invention simplify ecotoxic problems. The drilling compositions according to the invention exhibit a good solubility of organic and inorganic components. In addition, the drilling compositions based in accordance with the invention on the co-use of esters of the described type are further distinguished by improved storage stability, improved lubricity and good rheological properties.

A contribution to solving the above problems is also made by a process for preparation of a drilling composition, comprising the steps:

a) providing as component i. from about 20 wt. % to about 99.999 wt. %, preferably from about 40 wt. % to about 99.990 wt. %, preferably from about 60 wt. % to about 99.900 wt. %, preferably from about 70 wt. % to about 99 wt. %, more preferably from about 80 wt. % to about 98.5 wt. %, yet more preferably from about 85 wt. % to about 98 wt. %, even more preferably from about 90 wt. % to about 98 wt. %, more preferably from about 92 wt. % to about 97 wt. %, most preferably from about 93 wt. % to about 96 wt. %, based on the total weight of components i. and ii., of at least one linear or branched, cyclic or non-cyclic, saturated hydrocarbon, b) providing as component ii. from about 0.001 wt. % to about 25 wt. %, preferably from about 0.5 wt. % to about 20 wt. %, more preferably from about 1 wt. % to about 15 wt. %, yet more preferably from about 2 wt. % to about 10 wt. %, even more preferably from about 2 wt. % to about 8 wt. %, more preferably from about 3 wt. % to about 7 wt. %, most preferably from about 4 wt. % to about 7 wt. %, based on the total weight of components i. and ii., of at least one linear or branched, cyclic or non-cyclic, saturated hydrocarbon, wherein the sum of the weight amounts provided in a) and b) is 100 wt. %, c) combining the at least one hydrocarbon and the at least one ester.

A contribution to solving the above problems is also made by a process for preparation of a drilling composition, comprising the steps:

A) preparation of an organic phase comprising components
  i. from about 20 wt. % to about 99.999 wt. %, preferably from about 40 wt. % to about 99.990 wt. %, preferably from about 60 wt. % to about 99.900 wt. %, preferably from about 70 wt. % to about 99 wt. %, more preferably from about 80 wt. % to about 98.5 wt. %, yet more preferably from about 85 wt. % to about 98 wt. %, even more preferably from about 90 wt. % to about 98 wt. %, more preferably from about 92 wt. % to about 97 wt. %, most preferably from about 93 wt. % to about 96 wt. %, based on the total weight of components i. and ii., of at least one linear or branched, cyclic or non-cyclic, saturated hydrocarbon,
  ii. from about 0.001 wt. % to about 25 wt. %, preferably from about 0.5 wt. % to about 20 wt. %, more preferably from about 1 wt. % to about 15 wt. %, yet more preferably from about 2 wt. % to about 10 wt. %, even more preferably from about 2 wt. % to about 8 wt. %, more preferably from about 3 wt. % to about 7 wt. %, most preferably from about 4 wt. % to about 7 wt. %, based on the total weight of components i. and ii., of at least one ester, B) preparation of an aqueous phase comprising from about 50 wt. % to 100 wt. %, preferably from about 55 wt. % to about 99 wt. %, more preferably from about 70 wt. % to about 95 wt. % water, based on the total amount of aqueous phase, C) combination of the organic phase prepared in step A) with from 0 to about 50 wt. %, preferably from about 5 wt. % to about 50 wt. %, preferably from about 5 wt. % to about 45 wt. %, more preferably from about 5 wt. % to about 35 wt. %, more preferably from about 10 wt. % to about 25 wt. %, based on the total weight of the composition, of the aqueous phase prepared in step B), and D) combination of at least one of the organic phase, the aqueous phase and the combination of the oil phase and the aqueous phase with from 0 to about 60 wt. %, based on the total weight of composition, of at least one additive.

The at least one linear or branched, cyclic or non-cyclic, saturated hydrocarbon is preferably selected from the hydrocarbons mentioned above in connection with the composition according to the invention.

The at least one ester is preferably at least one ester selected from the esters described above in connection with the composition according to the invention, preferably from the group consisting of esters formed from at least one $C_1$ to $C_{24}$ monocarboxylic acid with at least one monofunctional alcohol.

The aqueous phase is preferably a salt-saturated aqueous phase as described above in connection with the composition according to the invention.

The at least one additive is preferably at least one additive selected from the additives mentioned above in connection with the composition according to the invention.

The amounts of each of the above components are preferably selected as described above for the composition according to the invention.

The combination in step C) can occur by adding the organic phase to the aqueous phase, by adding the aqueous phase to the organic phase, or by introducing the organic phase and the aqueous phase at substantially the same time into a vessel in which they are to be combined. The combination preferably occurs with input of energy, preferably in the form of mixing or stirring, preferably rapid stirring, preferably stirring at a rate above 50 rpm, preferably in the range from about 100 rpm to about 500 rpm, more preferably in the range from about 200 rpm to about 450 rpm. The combination can occur at decreased, ambient or elevated temperature, depending on factors such as the components to be combined, the location at which they are combined (for example, indoors or outdoors), and the desired emulsion droplet size. A combination at ambient temperature is preferred.

The at least one additive can be introduced before, during or after any or all of steps A), B) and C). If one or more additives are introduced in step C), this additive may be introduced at substantially the same time as combining the organic phase with the aqueous phase as described above, or it may be added to either the organic phase or the aqueous phase or to both, for example with at least one additive being added to the organic phase and at least one further additive being added to the aqueous phase, before combination in step C), or the at least one additive may be added to the composition obtained after combination of the organic phase with the aqueous phase in step C).

In a variant of the process according to the invention, the at least one ester according to the invention can be added to an already existing drilling composition comprising at least one hydrocarbon, aqueous phase and at least one additive, in a so-called post-treatment step. In this case it is conceivable that the already existing drilling composition has already been used at least once in a drilling operation, prior to the post-treatment with the at least one ester. It is also possible that the already existing drilling composition has not yet been used in a drilling operation before the post-treatment.

The process according to the invention preferably further comprises the step
E) homogenization.

The homogenization is preferably a homogenization of the composition obtained in step C) or step D) of the process according to the invention. It is also possible that steps C) and E), or steps C), D) and E) are combined with each other, so that the combination of the oil phase and the aqueous phase with each other and/or with any additive used takes the form of a homogenization. It is preferred in the process according to the invention that the homogenization occurs during or after at least one of steps C) and D). The homogenization is preferably carried out at temperatures in the range from 0 to 100° C., preferably in the range from 5 to 80° C., more preferably in the range from 10 to 60° C., yet more preferably in the range from 20 to 50° C., most preferably at ambient temperatures. The homogenization may also be a high pressure homogenization carried out at pressures in the range from $1 \times 10^7$ Pa to $18 \times 10^7$ Pa, preferably in the range from $3 \times 10^7$ Pa to $18 \times 10^7$ Pa, more preferably in the range from $5 \times 10^7$ Pa to $15 \times 10^7$ Pa.

It is preferred in the process according to the invention that the composition at the end of at least one of steps C), D) and E) is in the form of an emulsion. Thus, an emulsion may be formed by combining the oil phase with the aqueous phase as described for step C) above, optionally in the presence of at least one additive, which may be, for example, at least one emulsifier. Alternatively, an emulsion may be formed by subjecting the oil phase and the aqueous phase together, optionally in the presence of at least one additive, which may be, for example, at least one emulsifier, to a homogenization step, as described for step E) above. Homogenization, in particular high pressure homogenization, generally results in emulsions with smaller droplet sizes compared to simple combination of the oil phase and the aqueous phase.

In a preferred embodiment of the process according to the invention, the emulsion is a nanoemulsion or a microemulsion as described above in connection with the composition according to the invention, with number average droplet sizes smaller than 1000 µm, preferably in the range from 5 nm to 1000 µm, preferably in the range from 10 nm to 850 µm, more preferably in the range from 20 nm to 700 µm, more preferably in the range from 50 nm to 500 µm.

In a preferred aspect of the process according to the invention, the at least one ester has a carbon chain distribution of the acid-derived component determined by gas chromatography (GC) according to ISO 5508 with carbon numbers in the ranges of from 0 to 2.00%, preferably in the range of from 0 to 1.00%, more preferably in the range of from 0 to 0.5% $C_6$, in the range of from 3.00% to 10.00%, preferably in the range of from 3.00 to 8.00%, more preferably in the range of from 4.00 to 7.00% $C_8$, in the range of from 3.00% to 10.00%, preferably in the range of from 3.00 to 9.00%, more preferably in the range of from 5.00 to 8.00% $C_{10}$, in the range of from 50.00% to 94.00%, preferably in the range of from 55.00 to 90.00%, more preferably in the range of from 60.00 to 85.00% $C_{12}$, in the range of from 0 to 25.00%, preferably in the range of from 5.00 to 20.00%, more preferably in the range of from 10.00 to 20.00% $C_{14}$, in the range of from 0 to 5.00%, preferably in the range of from 1.00 to 4.00%, more preferably in the range of from 2.00 to 4.00% $C_{16}$ and in the range of from 0 to 1.00%, preferably in the range of from 0.01 to 0.90%, more preferably in the range of from 0.1 to 0.6% $C_{18}$. The acid-derived component determined by gas chromatography of an ester refers to the chromatographic equivalent of an acid, which would have been formed upon hydrolytic cleavage of that ester into an alcohol and an acid.

In another preferred embodiment of the process according to the invention, the at least one ester has a carbon chain distribution of the acid-derived component determined by gas chromatography (GC) according to ISO 5508 with carbon numbers in the range of from 0 to 2.00%, preferably in the range of from 0 to 1.00%, more preferably in the range of from 0 to 0.5% $C_6$, in the range of from 0 to 10.00%, preferably in the range of from 1.00 to 7.00%, more preferably in the range of from 2.00 to 5.00% $C_8$, in the range of from 0 to 10.00%, preferably in the range of from 1.00 to 7.00%, more preferably in the range of from 2.00 to 5.00% $C_{10}$, in the range of from 50.00% to 95.00%, preferably in the range of from 60.00 to 90.00%, more preferably in the range of from 65.00 to 85.00% $C_{12}$, in the range of from 5.00% to 35.00%, preferably in the range of from 8.00 to 30.00%, more preferably in the range of from 10.00 to 25.00% $C_{14}$, in the range of from 0 to 5.00%, preferably in the range of from 1.00 to 4.00%, more preferably in the range of from 2.00 to 4.00% $C_{16}$ and in the range of from 0 to 1.00%, preferably in the range of from 0.01 to 0.90%, more preferably in the range of from 0.1 to 0.6% $C_{18}$. The acid-derived component determined by gas chromatography of an ester refers to the chromatographic equivalent of an acid, which would have been formed upon hydrolytic cleavage of that ester into an alcohol and an acid.

The invention also relates to a drilling composition obtainable by a process according to the invention and having at least one, preferably at least two, more preferably at least three of the following properties:
γ1) a plastic viscosity (PV) measured at 50° C. according to the herein described test method in the range from 15 to 75 mPa·s, preferably in a range of from about 15 to about 60 mPa·s, more preferably in a range of from about 15 to about 40 mPa·s, more preferably in a range of from about 15 to about 30 mPa·s, yet more preferably in a range of from about 15 to about 25 mPa·s;

γ2) a yield point (YP) measured at 50° C. according to the herein described test method in the range from 5 to 45 lb/100 ft$^2$ (about 2.4 to about 21.6 Pa), preferably in a range of from about 5 to about 40 lb/100 ft$^2$ (about 2.4 to about 20 Pa), preferably in a range of from about 6 to about 25 lb/100 ft$^2$, (about 2.9 to about 12 Pa), more preferably in a range of from about 8 to about 20 lb/100 ft$^2$, (about 3.8 to about 10 Pa);

γ3) a gel strength (GS) measured at 50° C. according to the herein described test method in the range from 4 to 25 lb/100 ft$^2$ (1.9 to 12 Pa), preferably in a range of from about 4 to about 15 lb/100 ft$^2$ (about 1.9 to about 7.2 Pa), preferably in a range of from about 4 to about 10 lb/100 ft$^2$, (about 1.9 to about 4.8 Pa), more preferably in a range of from about 4 to about 8 lb/100 ft$^2$, (about 1.9 to about 3.8 Pa).

γ4) viscosity values (Brookfield, RVT, determined according to ASTM 2983) at temperatures of 0° C. to 5° C. of not more than 10 mPa·s, preferably of not more than 8 mPa·s and preferably in the range of from about 2.0 to 5.0 mPa·s, more preferably in the range of from about 2.5 to 4.5 mPa·s, yet more preferably in the range of from about 2.7 to 4.0 mPa·s;

γ5) storage stability at 20° C. of at least two weeks, preferably of at least one month, more preferably of at least three months, more preferably of at least six months, more preferably of at least one year, whereby the combinations of properties γ1)γ2), γ1)γ3), γ2)γ3), γ1)γ2)γ3), γ1)γ2)γ3)γ4), γ1)γ2)γ3)γ5), γ1)γ2)γ3)γ4)γ5), are preferred, whereby the property combinations γ1)γ2)γ3), γ1)γ2)γ3)γ4), γ1)γ2)γ3)γ5) and γ1)γ2)γ3)γ4)γ5) are particularly preferred.

The compositions according to the invention further preferably have improved lubricity compared to previous drilling compositions.

The invention also relates to the use of a composition according to the invention or of a composition prepared according to a process according to the invention as a drilling fluid.

The invention also relates to a drilling system comprising a drill head, a drill string, a reservoir for drilling composition and a drilling composition according to the invention or prepared according to a process according to the invention.

The invention also relates to a process for making a borehole comprising the steps:
 a1) providing a composition according to the invention or a composition prepared according to a process according to the invention,
 a2) drilling a hole in a subterranean formation;
 a3) circulating the composition provided in a1) at least partially in the hole at least partially while drilling.

Suitable methods and equipment for drilling in step a2) are well known to the person skilled in the art, as are methods and means, for example using pumps, for circulating a drilling fluid according to step a3). The drilling composition according to the invention has been found to be particularly advantageous, owing to the combination of properties such as environmental compatibility and biodegradability, low toxicity, viscosity, rheological properties, while providing good lubricity and allowing a good penetration rate of the drill into the subterranean formation.

The invention also relates to a process for conveying cuttings from a hole drilled in a subterranean formation, preferably a process for conveying cuttings from a hole drilled in a subterranean formation to the surface, comprising the steps:
 b1) providing a composition according to the invention or a composition prepared according to a process according to the invention,
 b2) circulating the composition provided in b1) at least partially in the hole.

It is preferred in the process for conveying cuttings from a hole drilled in a subterranean formation that the composition is circulated at least partially while drilling the hole. The composition will generally be circulated by passing through the drill assembly and out via the drill head, then passing back along the drill hole towards the surface, conveying the cuttings in the flow.

The invention also relates to a process for treatment of a drill head comprising the steps:
 c1) providing a composition according to the invention or a composition prepared according to a process according to the invention,
 c2) circulating the composition provided in c1) at least partially through the drill head at least partially while the drill head is operated in a subterranean formation.

In a preferred embodiment of the process for treatment of a drill head, the treatment is at least one of cleaning, cooling and lubrication. The drilling composition according to the invention has been found to be particularly suitable for such treatment owing to the combination of hydrophilic and hydrophobic components comprised therein.

The invention also relates to a process for production of at least one of oil and gas, comprising process steps:
 d1) providing a composition according to the invention or a composition prepared by a process according to the invention,
 d2) drilling at least one hole in a subterranean formation while at least partially circulating the composition provided in d1) at least partially in the hole;
 d3) obtaining at least one of oil and gas from the subterranean formation at least partially by means of the at least one hole drilled in d2);
 d4) optionally, subjecting the at least one of oil and gas to at least one processing step selected from purifying, refining and treating.

Steps d1) and d2) may be carried out by methods known to the skilled person, as described above. Step d3) may also be carried out by methods known to the skilled person, and may comprise stages such as pumping, collecting, storing, and the like. Step d4) may be carried out at the same location as the operation described by steps d1) to d3), or it may be carried out at a different location. If step d4) is carried out at a different location to steps d1) to d3), in particular a different location to step d3), the process will also comprise a step of transporting or conducting at least one of oil and gas from the location of at least step d3) to the location of step d4).

The invention is now more closely illustrated by means of examples, which are not intended to limit the scope of the invention.

EXAMPLES

Test Methods

Plastic Viscosity (PV), Yield Point (YP), Gel Strength

Plastic viscosity, yield point and gel strength were measured using a Fann® direct reading viscometer (Model 35 from Fann Instrument Company, Houston, Tex., USA) according to the method described in "*Recommended Practice for Field Testing of Oil-based Drilling Fluids*", Upstream Segment, API (American Petroleum Institute) recommended practice 13B-2, Fourth Edition, March 2005, section 6.3, p. 8-10.

Electrical Stability

Electrical stability was measured using a Fann® electrical stability tester (Model 23D from Fann Instrument Company, Houston, Tex., USA) according to the method described in "*Recommended Practice for Field Testing of Oil-based Drilling Fluids*", Upstream Segment, API (American Petroleum Institute) recommended practice 13B-2, Fourth Edition, March 2005, section 10, p. 22-24.

Example 1

An oil phase was prepared by combining 249.4 ml of PureDrill® HT-40 (Petro-Canada, Canada) with 13.1 ml of a 2-ethylhexyl ester of $C_8$-$C_{14}$ fatty acids obtainable from Cognis Oleochemicals GmbH, Dusseldorf, Germany, under the trade name OMC 586. This oil phase was then combined with 4.2 g of EZ MUL® NT (from the company Halliburton (Baroid), Texas, USA), 87.5 ml of a 25% (by weight) aqueous calcium chloride solution, 3.5 g of DURATONE® HT (from the company Halliburton (Baroid), Texas, USA), 3.5 g of GELTONE® II (from the company Halliburton (Baroid), Texas, USA), Texas, USA), and 280 g of barite. Rheological parameters were determined at 50° C. as shown in Table 1 under the heading "before ageing".

The mixture was aged by treatment in an autoclave in a Baroid roller oven model 70040 at 121° C. (250° F.) for 16 hours according to the method described in "*Recommended Practice for Laboratory Testing of Drilling Fluids*", API (American Petroleum Institute) recommended practice 13I, Seventh Edition, February 2004/ISO 10416:2002 (modified), section 21, p. 66-73. The electrical stability and rheological parameters were then determined at 50° C. as shown in Table 1 under the heading "after ageing".

TABLE 1

| | Before ageing | After ageing |
|---|---|---|
| Electrical stability (V) | n.d. | 490 |
| Measured values | | |
| 600 rpm | 49 | 50 |
| 300 rpm | 30 | 31 |
| 200 rpm | 22 | 23 |
| 100 rpm | 14 | 15 |
| 6 rpm | 5 | 6 |
| 3 rpm | 4 | 5 |
| Plastic viscosity (cP) | 19 | 19 |
| Yield point (lbf/100 ft$^2$) | 11 | 12 |
| Gel strength 10 s/10 min (lbf/100 ft$^2$) | 5/6 | 5/6 | n.d. = not determined

Example 2

The same procedure was followed as that for Example 1, with the difference that 26.2 ml of OMC 586 was used.

Example 3

To a composition consisting of 249.4 ml of PureDrill® HT-40 (Petro-Canada, Calgary, Canada), 4.2 g of EZ MUL® NT (from the company Halliburton (Baroid Fluid Services), Texas, USA), 87.5 ml of a 25% (by weight) aqueous calcium chloride solution, 3.5 g of DURATONE® HT (from the company Halliburton (Baroid Fluid Services), Texas, USA), 3.5 g of GELTONE® II (from the company Halliburton (Baroid Fluid Services), Texas, USA), Texas, USA), and 280 g of barite., was added 13.1 ml of OMC 586 (Cognis Oleochemicals GmbH, Dusseldorf, Germany).

Example 4

The same procedure was followed as that for Example 3, with the difference that 26.2 ml of OMC 586 was added.

Example 5

The procedure of Example 1 was followed, with the difference that 1.5 g of the structure building agent GELTONE II was used. The yield point of the product before ageing by heat rolling as described for Example 1 was 8 lb/100 ft$^2$. The yield point of the product after ageing by hot rolling as described for Example 1 was 10 lb/100 ft$^2$.

Example 6: Rate of Penetration (ROP)

Boreholes were drilled using the compositions of Examples 1 to 4 as drilling fluid, and the respective rate of penetration measured as distance per hour. The rock formation which was drilled into, the drilling equipment, weight on bit, and rotation speed (rpm), were maintained effectively constant for each test, so that the only variable was the drilling fluid. In this way, comparative data were obtained for the different compositions. The results are shown in Table 2.

TABLE 2

| Example | Penetration rate test result |
|---|---|
| 1 | very good |
| 2 | good |
| 3 | satisfactory |
| 4 | satisfactory |

Drilling into subterranean formations, whether onshore or offshore, is accompanied by substantial costs. It is thus advantageous to reduce overall drilling time. Penetration rate, while not being the sole factor determining overall drilling time, provides a considerable contribution thereto. Faster penetration rates are therefore desirable. The above results show that the composition according to the invention, and in particular the use of the above-described esters in combination with a saturated hydrocarbon (paraffin) as described above, results in improved penetration rates when drilling, thereby contributing to reducing overall drilling time.

The invention claimed is:

1. A process for the preparation of a drilling composition, comprising the steps of:
   a) providing component i) of from 92 wt. % to 98 wt. %, based on a total amount of i) and ii), of at least one linear or branched, cyclic or non-cyclic, saturated hydrocarbon,
   b) providing component ii) of from 2 wt. % to 8 wt. %, based on the total amount of i) and ii), of at least one ester having a carbon chain distribution of an acid-derived component with carbon numbers in the ranges of from 0 to 0.50% $C_6$, from 4.00% to 7.00% $C_8$, from 5.00% to 8.00% $C_{10}$, from 60.00% to 80.00% $C_{12}$, from 10.00 to 20.00% $C_{14}$, from 2.00 to 4.00% $C_{16}$ and from 0.1 to 0.60% $C_{18}$, wherein the ester has a viscosity determined using a Brookfield RVT viscometer (Brookfield, RVT viscosity) at temperatures of 0° C. to 5° C. of not more than 10 mPas and a non-toxicity measured by the 96 hour $LC_{50}$ Mysid shrimp acute toxicity bioassay test result of greater than 800,000, and wherein the sum of the weight amounts provided in a) and b) is 100 wt. %, c) combining component i) and component ii), wherein the sum of the weight components i) to ii) is 100 wt. % and wherein at least 50% of the ester is based on saturated aliphatic $C_{12}$-$C_{14}$ monocarboxylic acids and a monofunctional $C_2$-$C_{12}$ alcohol or mixtures thereof.

2. The process according to claim 1, wherein the at least one hydrocarbon is at least one alkane.

3. The process according to claim 1, wherein the at least one hydrocarbon comprises at least one iso-alkane.

4. The process according to claim 1, wherein the hydrocarbon comprises at least one $C_{10}$ to $C_{25}$ alkane selected from the group consisting of n-alkanes, i-alkanes, sec-alkanes, tert-alkanes, or a mixture of two or more thereof.

5. The process according to claim 1, wherein the hydrocarbon comprises a polynuclear aromatic content measured by high resolution mass spectrometry of less than 50 ppm, whereby wt. % and ppm amounts are based on a total amount of component i.

6. The process according to claim 1, wherein the hydrocarbon comprises a viscosity of between 1 and 10 centistokes.

7. The process according to claim 1, wherein the hydrocarbon comprises a viscosity of less than 7 centistokes.

8. The process according to claim 1, wherein the hydrocarbon comprises a pour point in the range from −60° C. to −10° C.

9. A process for preparation of a drilling composition, comprising the steps:
A) preparing an organic phase comprising components i from 92 wt. % to 98 wt. %, based on the total weight of components i and ii, of at least one linear or branched, cyclic or non-cyclic, saturated hydrocarbon, ii from 2 wt. % to 8 wt. %, based on the total weight of components i and ii, of at least one ester having a carbon chain distribution of an acid-derived component with carbon numbers in the ranges of from 0 to 0.50% $C_6$, from 4.00% to 7.00% $C_8$, from 5.00% to 8.00% $C_{10}$, from 60.00% to 80.00% $C_{12}$, from 10.00 to 20.00% $C_{14}$, from 2.00 to 4.00% $C_{16}$ and from 0.1 to 0.60% $C_{18}$, wherein the ester has a viscosity determined using a Brookfield RVT viscometer (Brookfield, RVT viscosity) at temperatures of 0° C. to 5° C. of not more than 10 mPas and a non-toxicity measured by the 96 hour $LC_{50}$ Mysid shrimp acute toxicity bioassay test result of greater than 800,000;
B) preparing an aqueous phase comprising from 50 wt. % to 100 wt. % water, based on a total amount of aqueous phase;
C) combining the organic phase prepared in step A) with from 0 to 50 wt. %, based on the total weight of the composition, of the aqueous phase prepared in step B); and
D) combining at least one of the organic phase, the aqueous phase and the combination of the organic phase and the aqueous phase with from 0 to 60 wt. %, based on the total weight of the composition, of at least one additive.

10. The process according to claim 9, further comprising a step E) homogenization.

11. The process according to claim 10, wherein the composition at the end of at least one of steps C), D) or E) is in the form of an emulsion.

12. The process according to claim 11, wherein the emulsion is a nanoemulsion or a microemulsion with droplet sizes in the range from 5 nm to 1000 μm.

13. A process for making a borehole comprising the steps of:
a1) providing a drilling composition comprising
I) an organic phase comprising components
i. from 92 wt. % to 98 wt. %, based on the total weight of components i. and ii., of at least one linear or branched, cyclic or non-cyclic, saturated hydrocarbon,
ii. from 2 wt. % to 8 wt. %, based on the total weight of components i. and ii., of at least one ester having a carbon chain distribution of an acid-derived component with carbon numbers in the ranges of from 0 to 0.50% $C_6$, from 4.00% to 7.00% $C_8$, from 5.00% to 8.00% $C_{10}$, from 60.00% to 80.00% $C_{12}$, from 10.00 to 20.00% $C_{14}$, from 2.00 to 4.00% $C_{16}$ and from 0.1 to 0.60% $C_{18}$, wherein the ester has a viscosity determined using a Brookfield RVT viscometer (Brookfield, RVT viscosity) at temperatures of 0° C. to 5° C. of not more than 10 mPas and a non-toxicity measured by the 96 hour $LC_{50}$ Mysid shrimp acute toxicity bioassay test result of greater than 800,000,
II) from 0 to 50 wt. %, based on the total weight of the composition, of water or aqueous phase, and
III) from 0 to 60 wt. %, based on the total weight of the composition, of at least one additive,
wherein the sum of the weight components I) to III) is 100 wt. % and wherein at least 50% of the ester is based on saturated aliphatic $C_{12}$-$C_{14}$ monocarboxylic acids and a monofunctional $C_2$-$C_{12}$ alcohol or mixtures thereof;
a2) drilling a hole in a subterranean formation; and
a3) circulating the composition provided in a1) at least partially in the hole at least partially while drilling.

14. The process according to claim 13, wherein the at least one hydrocarbon is at least one alkane.

15. The process according to claim 13, wherein the at least one hydrocarbon comprises at least one iso-alkane.

16. The process according to claim 13, wherein the hydrocarbon comprises at least one $C_{10}$ to $C_{25}$ alkane selected from the group consisting of n-alkanes, i-alkanes, sec-alkanes, tert-alkanes, or a mixture of two or more thereof.

17. The process according to claim 13, wherein the hydrocarbon comprises a polynuclear aromatic content measured by high resolution mass spectrometry of less than 50 ppm, whereby wt. % and ppm amounts are based on a total amount of component i.

18. The process according to claim 13, wherein the hydrocarbon comprises a viscosity of between 1 and 10 centistokes.

19. The process according to claim 13, wherein the hydrocarbon comprises a pour point in the range from −60° C. to −10° C.

* * * * *